United States Patent
Shirakata et al.

(10) Patent No.: US 11,070,948 B2
(45) Date of Patent: Jul. 20, 2021

(54) POSITION ESTIMATION DEVICE AND POSITION ESTIMATION METHOD

(71) Applicant: Panasonic Intellectual Property Corporation of America, Torrance, CA (US)

(72) Inventors: Naganori Shirakata, Kanagawa (JP); Hiroshi Takahashi, Kanagawa (JP); Kazuma Nishiyasu, Kanagawa (JP); Junichi Morita, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 53 days.

(21) Appl. No.: 16/747,226

(22) Filed: Jan. 20, 2020

(65) Prior Publication Data

US 2020/0154244 A1 May 14, 2020

Related U.S. Application Data

(63) Continuation of application No. PCT/JP2018/021302, filed on Jun. 4, 2018.

(30) Foreign Application Priority Data

Jul. 24, 2017 (JP) .............................. JP2017-142995

(51) Int. Cl.
*H04W 4/029* (2018.01)
*G01S 5/02* (2010.01)
(Continued)

(52) U.S. Cl.
CPC ........... *H04W 4/029* (2018.02); *G01S 5/0289* (2013.01); *G01S 5/145* (2013.01); *H04W 4/023* (2013.01)

(58) Field of Classification Search
CPC ..... H04W 4/029; H04W 4/023; G01S 5/0289; G01S 5/145
See application file for complete search history.

(56) References Cited

U.S. PATENT DOCUMENTS

2004/0203380 A1* 10/2004 Hamdi .................. G01S 5/0289
455/41.2
2005/0266860 A1* 12/2005 Tamaki ................. G01S 5/0289
455/456.6
(Continued)

FOREIGN PATENT DOCUMENTS

| JP | 2005-348418 | 12/2005 |
|----|-------------|---------|
| JP | 2008-113184 | 5/2008 |

(Continued)

OTHER PUBLICATIONS

Google Patent Translation of JP2013128227A (Year: 2011).*
International Search Report of PCT application No. PCT/JP2018/021302 dated Aug. 21, 2018.

*Primary Examiner* — Matthew C Sams
(74) *Attorney, Agent, or Firm* — Seed IP Law Group LLP

(57) ABSTRACT

A position estimation device includes: a selector configured to select N wireless terminals and reselect N wireless terminals from M wireless terminals; a distance calculator configured to calculate distances among wireless terminals in a group consisting of a parent wireless terminal and the N wireless terminals based on information on power of radio signals of packets transmitted and received; a relative position calculator configured to calculate relative positions of the M wireless terminals based on the distances among the wireless terminals in the group for the N wireless terminals selected and reselected; and an absolute position converter configured to convert a relative position of a child wireless terminal into an absolute positon of the child wireless terminal based on the relative positions of the M wireless
(Continued)

terminals and absolute positions of at least three of the M wireless terminals where the absolute positions are known.

12 Claims, 13 Drawing Sheets

(51) Int. Cl.
*G01S 5/14* (2006.01)
*H04W 4/02* (2018.01)

(56) References Cited

U.S. PATENT DOCUMENTS

| | | |
|---|---|---|
| 2005/0271057 A1 | 12/2005 | Kim et al. |
| 2014/0256353 A1 | 9/2014 | Denis et al. |
| 2015/0189490 A1* | 7/2015 | Chan .................... G06F 3/1423 |
| | | 455/419 |

FOREIGN PATENT DOCUMENTS

| | | |
|---|---|---|
| JP | 2013-128227 | 6/2013 |
| JP | 2013128227 A * | 6/2013 |
| JP | 2014-534425 | 12/2014 |
| JP | 2015-070544 | 4/2015 |
| JP | 2017-015562 | 1/2017 |

* cited by examiner

M1

|    | P1  | A2  | A3  | N4  |
|----|-----|-----|-----|-----|
| P1 | -   | d12 | d13 | d14 |
| A2 | d12 | -   | d23 | d24 |
| A3 | d13 | d23 | -   | d34 |
| N4 | d14 | d24 | d34 | -   |

M2

|    | P1  | A3  | N4  | N5  |
|----|-----|-----|-----|-----|
| P1 | -   | d12 | d13 | d14 |
| A3 | d12 | -   | d23 | d24 |
| N4 | d13 | d23 | -   | d34 |
| N5 | d14 | d24 | d34 | -   |

|    | P1  | A2  | A3  | N4  |
|----|-----|-----|-----|-----|
| P1 | -   | d12 | d13 | d14 |
| A2 | d12 | -   | d23 | d24 |
| A3 | d13 | d23 | -   | d34 |
| N4 | d14 | d24 | d34 | -   |

|    | (x,y)      |
|----|------------|
| P1 | (rx1,ry1)  |
| A2 | (rx2,ry2)  |
| A3 | (rx3,ry3)  |
| N4 | (rx4,ry4)  | ns
POSITION ESTIMATION DEVICE AND POSITION ESTIMATION METHOD

RELATED APPLICATIONS

This application is a continuation of PCT International Application No. PCT/JP2018/021302, filed on Jun. 4, 2018, which claims the benefit of foreign priority of Japanese patent application 2017-142995 filed on Jul. 24, 2017, the contents all of which are incorporated herein by reference.

BACKGROUND

1. Technical Field

The present disclosure relates to a position estimation device and a position estimation method for estimating a position of a wireless terminal.

2. Background Art

In Unexamined Japanese Patent Publication No. 2005-348418, a method for estimating a position of a node in an ad-hoc/sensor network.

In the position estimation method in Unexamined Japanese Patent Publication No. 2005-348418, a position of a first node that recognizes the position is used for estimating a position of a second node that does not recognize the position. The first node generates and transmits a second packet that includes a distance relational coefficient calculated from first information (sum of transmitted distances) and second information (hop count) included in a first packet received via the second node. The second node estimates the position using the distance relational coefficient included in the transmitted second packet.

SUMMARY

In the position estimation method in Unexamined Japanese Patent Publication No. 2005-348418, nodes are distributed in a wide range. Further, a communication range of the nodes is limited, and the system is assumed to execute multi-hop communication. Moreover, in Unexamined Japanese Patent Publication No. 2005-348418, a distance between nodes is corrected using the information included in the transmitted packet, and the nodes estimate their positions through a calculation such as trilateration.

In Unexamined Japanese Patent Publication No. 2005-348418, however, under an environment where nodes are close to each other, most of the packets reach from one node to another node in one hop among a plurality of nodes, and it is difficult to correct a distance relational coefficient using a hop count.

As a result, under an environment where a large number of nodes are densely distributed in a narrow range, it is difficult to highly accurately estimate a position of a wireless terminal.

One non-limiting and exemplary embodiment of the present disclosure facilitates providing, in a wireless communication network in which wireless terminals are densely distributed, a position estimation device and a method for estimating a position that can improve accuracy in estimation of a position of a wireless terminal.

A position estimation device according to one aspect of the present disclosure includes: a selector configured to select N wireless terminals from M wireless terminals, and to replace at least one of the selected N wireless terminals with a same number of wireless terminals other than the selected N wireless terminals among the M wireless terminals to reselect N wireless terminals, M being an integer equal to or greater than two, N being an integer equal to or greater than one and being less than M, the M wireless terminals including a child wireless terminal; a distance calculator configured to calculate distances among wireless terminals in a group consisting of a parent wireless terminal and the N wireless terminals based on information on power of radio signals of packets transmitted and received among wireless terminals in the group for the N wireless terminals selected and reselected; a relative position calculator configured to calculate relative positions of the M wireless terminals based on the distances among the wireless terminals in the group for the N wireless terminals selected and reselected; and an absolute position converter configured to convert at least one relative position of the child wireless terminal into at least one absolute positon of the child wireless terminal based on the relative positions of the M wireless terminals and absolute positions of at least three of the M wireless terminals where the absolute positions are known.

It should be noted that these general or specific aspects may be implemented by using a system, a device, a method, an integrated circuit, a computer program, or a recording medium, and may also be implemented by any combination of the system, the device, the method, the integrated circuit, the computer program, and the recording medium.

According to one aspect of the present disclosure, in a wireless network in which wireless terminals are densely distributed, the accuracy in estimation of a position of a wireless terminal can be improved.

Additional advantages and effects of one aspect of the present disclosure will become apparent from the specification and drawings. The advantages and/or effects may be individually obtained by the various embodiments and features of the specification and drawings, which need not all be provided in order to obtain one or more of such advantages and/or effects.

DETAILED DESCRIPTION OF PREFERRED EMBODIMENTS

Hereinafter, exemplary embodiments of the present disclosure will be described in detail with reference to the drawings. Note that the exemplary embodiments described below are merely examples and are not intended to limit the present disclosure.

First Exemplary Embodiment

Figures 1A, 1B, 1C:
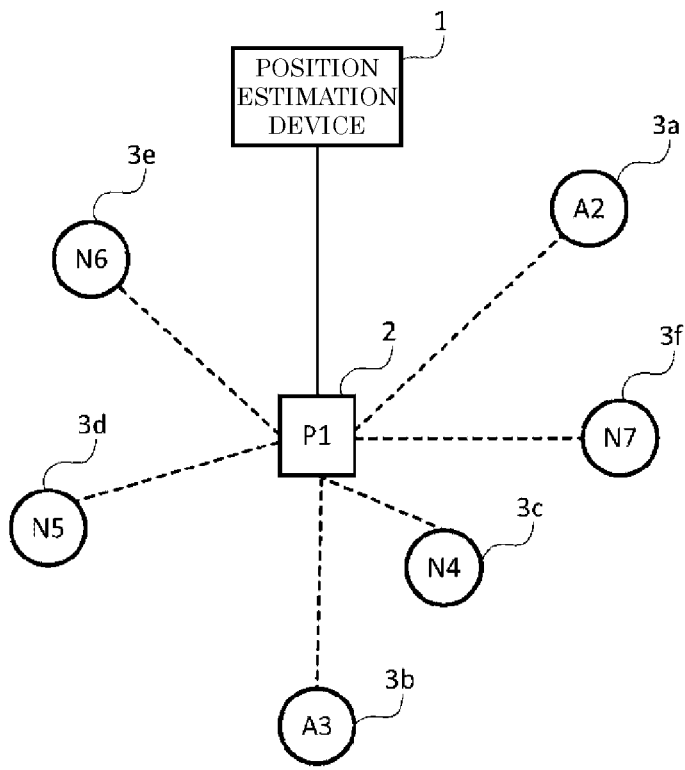
FIG. 1A is a diagram describing a position estimation device according to a first exemplary embodiment.
FIG. 1B is a diagram showing an example of a distance matrix according to the first exemplary embodiment.
FIG. 1C is a diagram showing an example of a distance matrix according to the first exemplary embodiment.

FIG. 1A is a diagram describing a position estimation device according to a first exemplary embodiment. FIG. 1A shows position estimation device 1, parent node (parent wireless terminal) 2, and child nodes (child wireless terminal) 3a to 3f. Moreover, FIG. 1B is a diagram showing distance matrix M1 that shows a distance between parent node 2 and each of child nodes 3a to 3c. FIG. 1C is a diagram showing distance matrix M2 that shows a distance between parent node 2 and each of child nodes 3b to 3d.

Parent node 2 and child nodes 3a to 3f are, for example, an access point and wireless sensor nodes or wireless terminals corresponding to wireless sensor nodes such as smart phones or tablet terminals. Position estimation device 1 communicates with child nodes 3a to 3f via parent node 2 to estimate the positions of child nodes 3a to 3f.

The position of parent node 2 is known. The positions of some of child nodes 3a to 3f are known. Here, the positions of child nodes 3a, 3b are known. Hereinafter, a child node whose position is known may be called anchor child node. A child node whose position is unknown may be called non-anchor child node. In the example of FIG. 1, child nodes 3a, 3b each are an anchor child node, and child nodes 3c to 3f each are a non-anchor child node.

"P1, A2, A3, N4 to N7" shown in FIG. 1A indicate identifiers that identify parent node 2 and child nodes 3a to 3f, respectively. Hereinafter, parent node 2 may be referred to as parent node P1. In addition, child nodes 3a, 3b may be referred to as child nodes A2 and A3, respectively. In addition, child nodes 3c to 3f may be referred to as child nodes N4 to N7, respectively. Note that "A" of child nodes A2, A3 represents an anchor child node, and "N" of child nodes N4 to N7 represents a non-anchor child node.

In recent years, a possession rate of a wireless terminal such as a smart phone and a tablet terminal has been increasing, and many wireless terminals gather in a venue where people gather such as a concert venue and an athletic stadium. When a light emitting element such as a light emitting diode (LED) is connected to each of the wireless terminals that have gathered in such a venue, and illuminance and colors are controlled, the venue can be produced as a display that projects illumination or an image.

In order to produce the wireless terminals that have gathered in the venue as a display, it is necessary to know the positions of the wireless terminals and control predetermined illuminance and colors with respect to the wireless terminals whose positions are known. Therefore, position estimation device 1 of FIG. 1A estimates the positions of the wireless terminals that have gathered in the venue.

Figure 2:
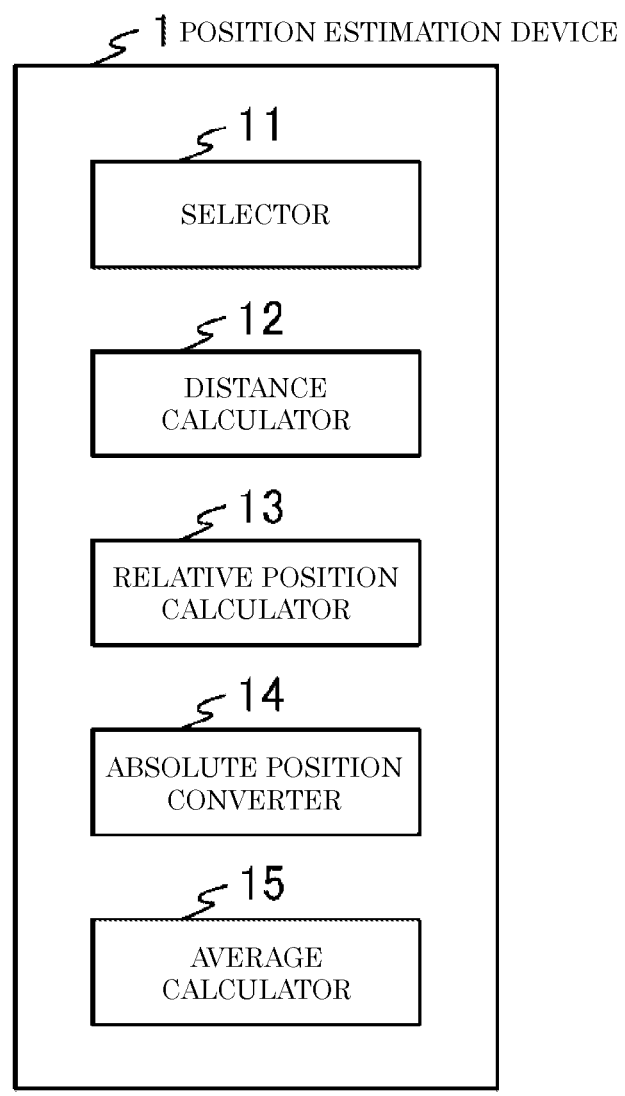
FIG. 2 is a diagram showing an example of a functional block of the position estimation device.

FIG. 2 is a diagram showing an example of a functional block of position estimation device 1. As shown in FIG. 2, position estimation device 1 includes selector 11, distance calculator 12, relative position calculator 13, absolute position convertor 14, and averaging section 15.

Selector 11 selects a prescribed number of child nodes from child nodes 3a to 3f, and then sequentially selects child nodes while replacing one of the prescribed number of child nodes 3a to 3f selected with one of remaining child nodes 3a to 3f not selected.

For example, selector 11 selects three child nodes A2, A3, N4 from six child nodes A2, A3, N4 to N7 shown in FIG. 1A. Next, selector 11 replaces child node A2 with child node N5, and then selects child nodes A3, N4, N5. Next, selector 11 replaces child node A3 with child node N6, and then selects child nodes N4, N5, N6. In this manner, selector 11 sequentially selects three child nodes while replacing one child node with another.

Note that selector 11 may select the prescribed number of child nodes 3a to 3f while replacing at least one of child nodes 3a to 3f. For example, selector 11 may select three of child nodes 3a to 3f while replacing two of child nodes 3a to 3f.

Distance calculator 12 calculates distances among child nodes 3a to 3f that have been sequentially selected (including distances among selected child nodes 3a to 3f and parent node 2).

Received power of a wireless packet attenuates as a distance between wireless terminals increases. Therefore, distance calculator 12 calculates the distance between wireless terminals based on received power of a wireless packet that has been transmitted or received between the wireless terminals. That is, distance calculator 12 calculates the distances among selected child nodes 3a to 3f by acquiring, via parent node 2, the received power obtained through a transmission or a reception of a wireless packet between parent node 2 and child nodes 3a to 3f.

For example, distance calculator 12 acquires, via parent node 2, received power of the wireless packets of selected child nodes A2, A3, N4, and calculates distances among parent node P1 and child nodes A2, A3, N4 as shown in distance matrix M1 of FIG. 1B.

Moreover, distance calculator 12 acquires, via parent node P1, received power of the wireless packets of selected child nodes A3, N4, N5, and calculates distances among parent node P1, and child nodes A3, N4, N5 as shown in distance matrix M2 of FIG. 1C.

Moreover, distance calculator 12 acquires, via parent node 2, received power of the wireless packets of selected child nodes N4, N5, N6, and calculates distances among parent node P1 and child nodes N4, N5, N6 (distance matrix for this is not shown in FIGS. 1B, 1C). Similar to the above, distance calculator 12 calculates distances among the selected child nodes.

Relative position calculator 13 calculates relative positions (relative coordinates) of parent node 2 and three child nodes based on the calculated distances between parent node 2 and the three child nodes. As a method for obtaining a relative position between devices based on a distance between the devices, multi dimensional scaling and the like can be exemplified. For example, relative position calculator 13 calculates relative positions of parent node 2 and the three child nodes from distance matrixes M1, M2 shown in FIGS. 1B and 1C by means of the multi dimensional scaling.

The relative positions indicate positions in which distance relations among parent node 2 and the three child nodes are preserved, and do not indicate absolute positional relations (absolute positions). For example, wireless terminals having a short distance from each other are disposed to have a short distance from each other, and wireless terminals having a long distance from each other are disposed to have a long distance from each other. Therefore, the relative positions rotate, reverse, move in parallel, expand, or shrink with respect to absolute positions of parent node 2 and the three child nodes.

When the relative positions are calculated, absolute position convertor 14 converts the calculated relative positions into absolute positions (absolute coordinates).

Figure 3A:
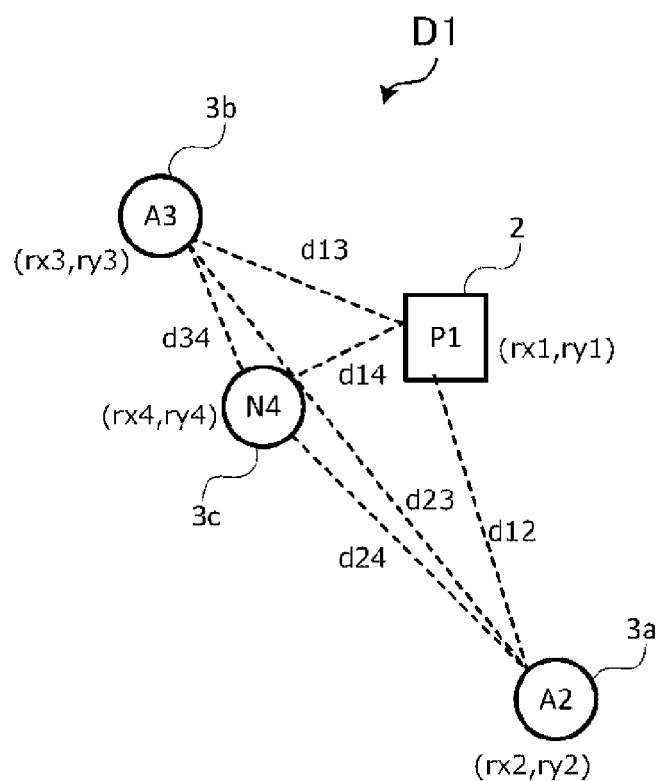
FIG. 3A is a diagram describing an example of conversion from a relative position to an absolute position.
Figure 3B:
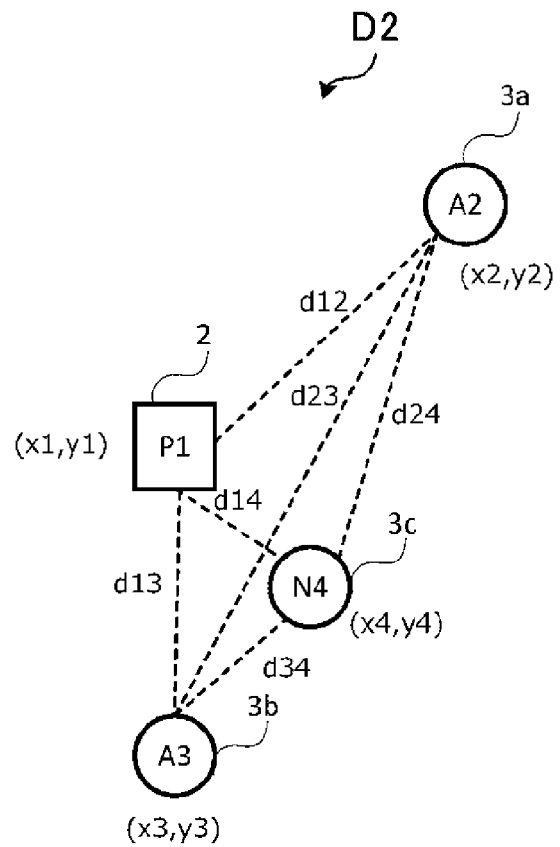
FIG. 3B is a diagram describing an example of conversion from a relative position to an absolute position.

FIGS. 3A and 3B each are a diagram describing an example of conversion from a relative position to an absolute position. Disposition D1 of FIG. 3A shows the relative positions of parent node P1 and child nodes A2, A3, N4 calculated from the distances shown in distance matrix M1 of FIG. 1B. In disposition D1, (rx1, ry1), (rx2, ry2), (rx3, ry3), and (rx4, ry4) of parent node P1 and child nodes A2, A3, N4 indicate relative coordinates of parent node P1 and child nodes A2, A3, N4, respectively.

Note that regarding parent node P1 and child nodes A2, A3, N4 disposed in the relative coordinates, the distance relations shown in distance matrix M1 of FIG. 1B are preserved. However, absolute positions are not preserved. For example, dispositions of parent node P1 and child nodes A2, A3, N4 shown in disposition D1 of FIG. 3A are different from the dispositions of parent node P1 and child nodes A2, A3, N4 shown in FIG. 1A and are rotated.

Absolute positions of parent node P1 and child nodes A2, A3, which are anchor child nodes, are known. Absolute position convertor 14 converts the relative position of child node N4 into an absolute position so as to minimize differences between the calculated relative positions of parent node P1 and child nodes A2, A3, and the known absolute positions of parent node P1 and child nodes A2, A3. In this manner, absolute position convertor 14 converts a relative position of a child node into an absolute position.

Note that disposition D2 of FIG. 3B shows parent node P1 and child nodes A2, A3, N4 disposed in the absolute positions thereof. Parent node P1 and child nodes A2, A3, N4 shown in disposition D2 are rotated from the dispositions of parent node P1 and child nodes A2, A3, N4 disposed in the relative positions shown in disposition D1 of FIG. 3A.

As described above, selector 11 selects three child nodes while replacing one child node with another. Relative position calculator 13 calculates relative positions among parent node 2 and three child nodes for each group in which the three child nodes have been replaced, and absolute position convertor 14 converts the calculated relative positions into absolute positions.

Figure 4A:
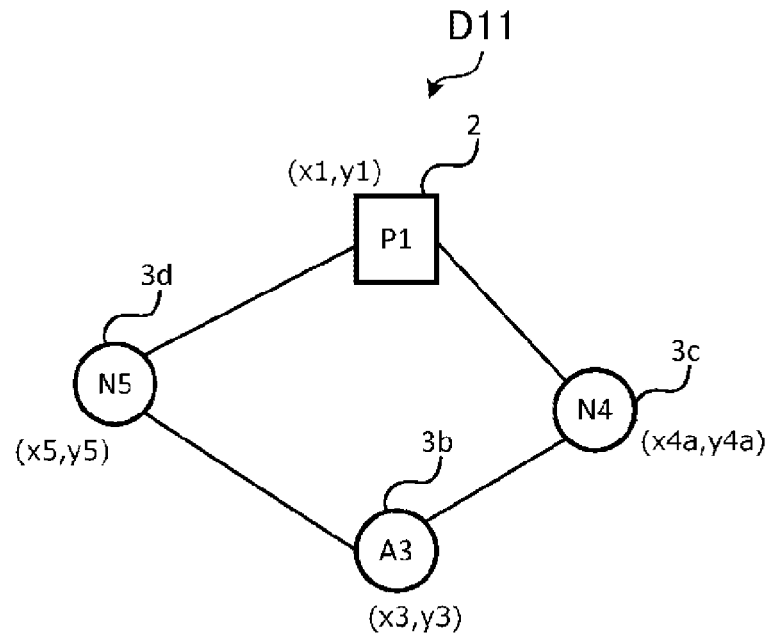
FIG. 4A is a diagram describing an example of calculation of an absolute position of a group in which a child node is replaced.
Figure 4B:
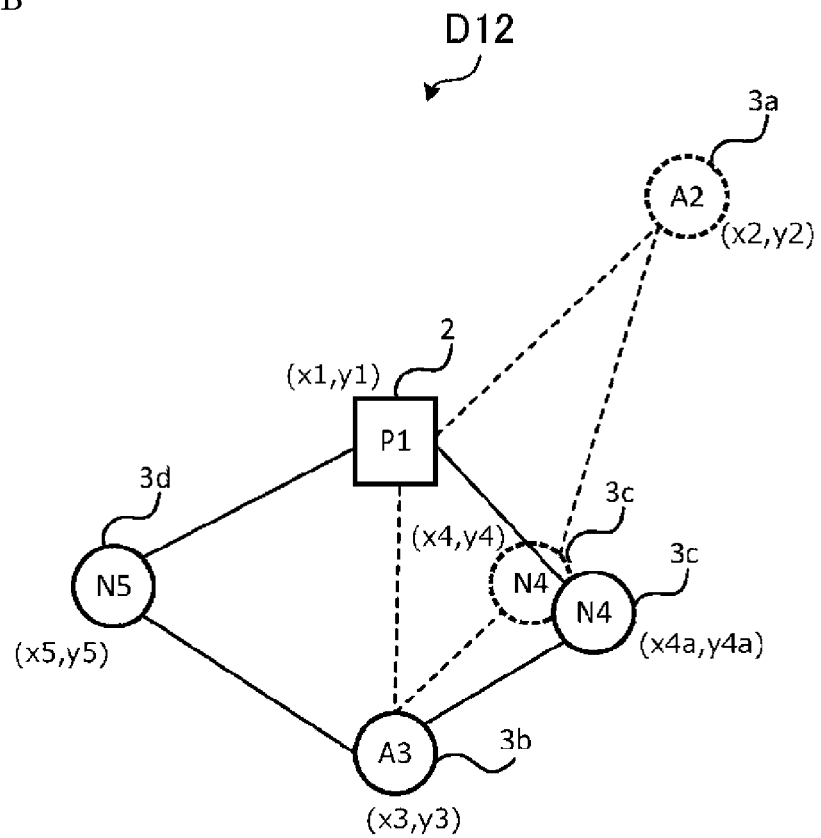
FIG. 4B is a diagram describing an example of calculation of an absolute position of a group in which a child node is replaced.

FIGS. 4A and 4B each are a diagram describing an example of calculation of an absolute position of a group in which a child node is replaced. Disposition D11 of FIG. 4A shows absolute positions of parent node P1 and child nodes A3, N4, N5 when child node A2 of selected child nodes A2, A3, N4 is replaced by child node N5. In disposition D11, (x1, y1), (x3, y3), (x4a, y4a), and (x5, y5) of parent node P1 and child nodes A3, N4, N5 indicate absolute coordinates of parent node P1 and child nodes A3, N4, N5, respectively. By a similar method to the methods described in FIGS. 1A, 1B, 1C, 3A, and 3B, absolute position convertor 14 calculates absolute positions of parent node P1 and child nodes A3, N4, N5 after child node A2 is replaced by child node N5.

When three child nodes are replaced, and absolute positions of parent node 2 and the three child nodes are calculated, a child node whose absolute position has been already calculated exists. Moreover, the calculated absolute position may be displaced from an original absolute position due to an error between the distances obtained from received power of a wireless packet or the like. Therefore, averaging section 15 averages the absolute position of each of the three child nodes, the absolute position being calculated while the three child nodes are replaced.

For example, portions shown in dotted lines shown in disposition D12 of FIG. 4B indicate absolute positions of child nodes A2, A3, N4 calculated before child node A2 is replaced by child node N5 (absolute positions of child nodes A2, A3, N4 shown in disposition D2 of FIG. 3B are indicated). The absolute position of child node N4 calculated this time is displaced from the absolute position calculated last time. Therefore, averaging section 15 averages absolute coordinate (x4, y4) and absolute coordinate (x4a, y4a) of child node N4. Then, averaging section 15 defines the averaged absolute coordinate as the absolute position of child node N4.

Next, selector 11 replaces child node A3 with child node N6. In this case, averaging section 15, for example, averages the absolute coordinate of child node N4, and averages the absolute coordinate of child node N5.

When averaging an absolute coordinate, averaging section 15 may average the absolute coordinate by weighting according to a passage of time. For example, averaging section 15 weights with a smaller coefficient when the calculated absolute coordinate is older. In the case shown in disposition D12 of FIG. 4B, averaging section 15 adds (multiplies) a smaller coefficient to absolute coordinate (x4, y4) than a coefficient that is added to absolute coordinate (x4a, y4a).

In this manner, selector 11 sequentially selects child nodes while replacing child nodes, relative position calculator 13 calculates relative positions from distances among the sequentially selected child nodes and the parent node, and absolute position convertor 14 converts the relative positions into absolute positions. Then, averaging section 15 averages the absolute positions of the child nodes and improves the accuracy of the absolute positions of the child nodes.

As described above, selector 11 selects a prescribed number of child nodes from child nodes 3a to 3f, and sequentially selects child nodes while replacing at least one of the prescribed number of child nodes 3a to 3f selected with a child node of remaining child nodes 3a to 3f not selected. Distance calculator 12 calculates distances among the selected child nodes 3a to 3f based on the received power of the wireless packets that have been transmitted or received among the selected child nodes 3a to 3f. Then, relative position calculator 13 calculates relative positions of parent node 2 and child nodes 3a to 3f based on the calculated distances, and absolute position convertor 14 converts the calculated relative positions into absolute positions. As a result, position estimation device 1 can improve the accuracy in estimation of a position of each of wireless terminals in a wireless communication network in which the wireless terminals are densely distributed.

Moreover, averaging section 15 averages the absolute position of each of wireless terminals, the absolute position being calculated while the child nodes are replaced. As a result, position estimation device 1 can improve the accuracy in estimation of a position of a wireless terminal.

Second Exemplary Embodiment

In a second exemplary embodiment, a case where wireless terminals that have gathered in a venue such as a concert venue or an athletic stadium are produced as a display that projects illumination or an image.

Figure 5:
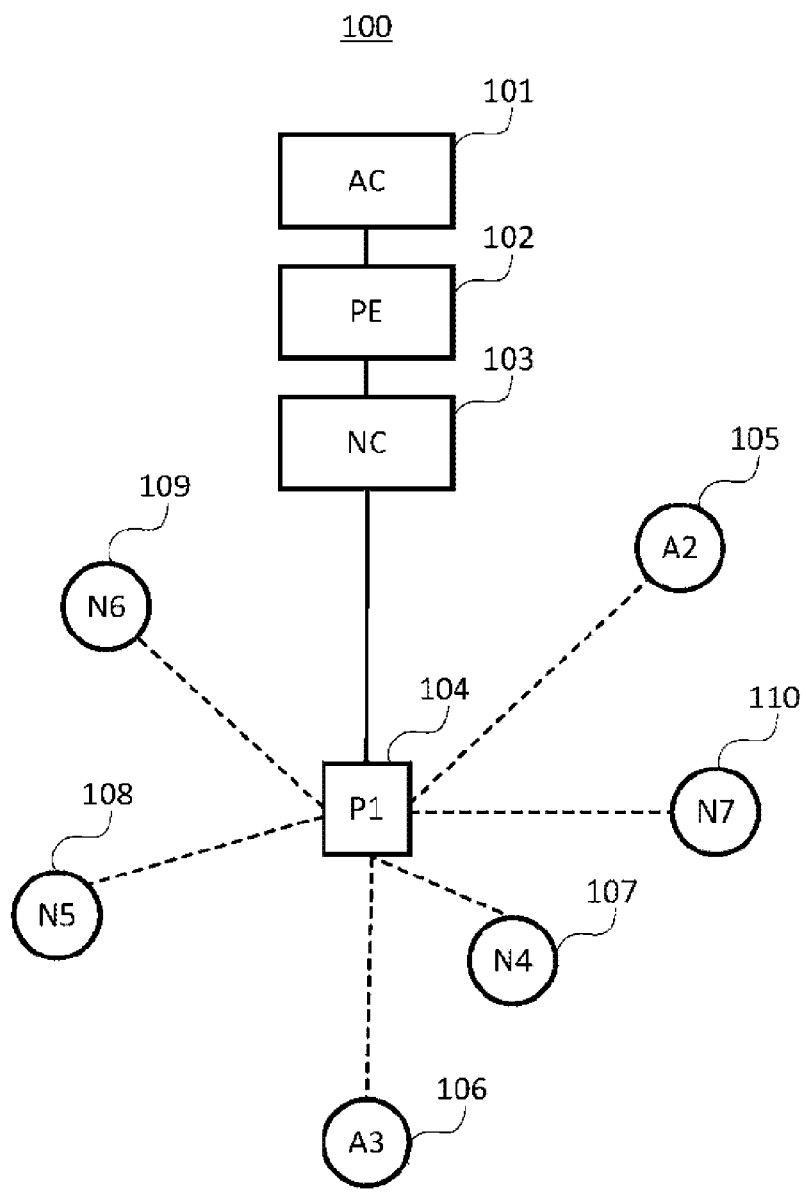
FIG. 5 is a diagram showing a system configuration of a wireless communication system according to a second exemplary embodiment.

FIG. 5 is a diagram showing a system configuration of wireless communication system 100 according to the second exemplary embodiment. As shown in FIG. 5, wireless communication system 100 includes application control (AC) 101, position estimator (PE) 102, network control (NC) 103, and wireless terminals 104 to 110. Wireless terminal 104 is a parent node, and wireless terminals 105 to 110 are child nodes. Application control 101, position estimator 102, and network control 103 may be implemented by, for example, one personal computer (PC). Alternatively, application control 101, position estimator 102, and network control 103 each may be implemented by, for example, a different computer.

Application control 101 controls an input and output unit (described later) of each of wireless terminals 104 to 110, and provides a user application. For example, application control 101 controls the illuminance and colors of a color LED connected to the output unit of each of wireless terminals 104 to 110. By so doing, application control 101 can provide a space production application that enables wireless terminals 104 to 110 to function as a display that projects illumination or an image.

Alternatively, application control 101 collects information of a sensor connected to the input unit of each of wireless terminals 104 to 110. By so doing, application control 101 can provide a space recognition application that detects, identifies, and recognizes information of a space where wireless terminals 104 to 110 are disposed.

Application control 101 sends application control command AC (p) that corresponds to position p to position estimator 102. Moreover, application control 101 receives application control response AR (p) that corresponds to position p from position estimator 102. Note that some applications do not require application control response AR (p).

Position estimator 102 estimates the position of each of wireless terminals 104 to 110 in the space where wireless terminals 104 to 110 are disposed, and generates conversion table DB between an ID of a wireless terminal and position p. Position estimator 102, for example, includes functional units shown in FIG. 2. How to estimate a position and how to generate a conversion table will be described later.

Position estimator 102 converts application control command AC (p) received from application control 101 into wireless terminal ID i that corresponds to position p, and converts ID i into application control command AC (i) that corresponds to wireless terminal i. Then, position estimator 102 sends application control command AC (i) to network control 103.

Moreover, position estimator 102 sends position estimation control command PC (j) used for estimating a position to network control 103. Moreover, position estimator 102 estimates a position of a wireless terminal using position estimation control response PR (j) from wireless terminal j received from network control 103, and updates the conversion table between the ID of the wireless terminal and position p.

Moreover, position estimator 102 converts application control response AR (i) from wireless terminal j received from network control 103 into position p that corresponds to wireless terminal ID i, converts position p into application control response AR(p) that corresponds to position p, and sends application control response AR(p) to application control 101. Here, i may be different from j.

Network control 103 controls a network such as connection management and routing of a wireless terminal in a wireless network including wireless terminals 104 to 110.

In order to send, to wireless terminals i and j, application control command AC (i) that corresponds to wireless terminal i and position estimation control command PC (j) that corresponds to wireless terminal j received from position estimator 102, network control 103 selects an appropriate parent node (for example, wireless terminal 104) to which wireless terminals i and j are connected.

Network control 103 sends transmitted data T (AC (i), PC (j)) to wireless terminals 105 to 110, which are child nodes, for wireless terminal 104, which is the selected parent node. Moreover, network control 103 receives, from wireless terminal 104, which is the parent node, received data R (AR (i), PR (j)) received by wireless terminal 104 from wireless terminals i and j.

Wireless terminals 104 to 110 configure a wireless network, and forward wireless packets among the terminals. Various types of network topology can be used. In FIG. 5, a star topology is described as an example.

Wireless terminal 104 (hereinafter, may be referred to as a parent node) is wirelessly connected to subordinate wireless terminals 105 to 110 (hereinafter, may be referred to as child nodes) in response to a request from network control 103, and transmits and receives wireless packets through scheduling and access control. The position where parent node 104 is disposed is known in advance.

In FIG. 5, parent node 104 is shown as one unit. Alternatively, a plurality of parent nodes 104 may exist, and network control 103 may control a greater number of child nodes 105 to 110 via the plurality of parent nodes.

Child nodes 105 to 110 are wirelessly connected to parent node 104, and transmit or receive wireless packets. Child nodes 105 to 110 receive application control command AC (i) or position estimation control command PC (j) addressed to child nodes 105 to 110 from the received wireless packets, and generates a response to each command. In a case of sending a response, child nodes 105 to 110 generate application control response AR (i) or position estimation control response PR (j), and send the response to parent node 104 via a wireless packet.

Among child nodes 105 to 110, a child node whose position is known in advance is called an anchor child node. In FIG. 5, child nodes 105, 106 each are the anchor child node.

On the other hand, among the child nodes, a child node whose position is unknown in advance is called a non-anchor child node. In FIG. 5, child nodes 107 to 110 each are the non-anchor child node.

In wireless communication system 100, position estimator 102 estimates the position of each of non-anchor child nodes 107 to 110. Application control 101 controls an application that corresponds to wireless terminals 107 to 110 whose positions have been estimated.

An example of a configuration of wireless terminal 104 will be described below.

Figure 6:
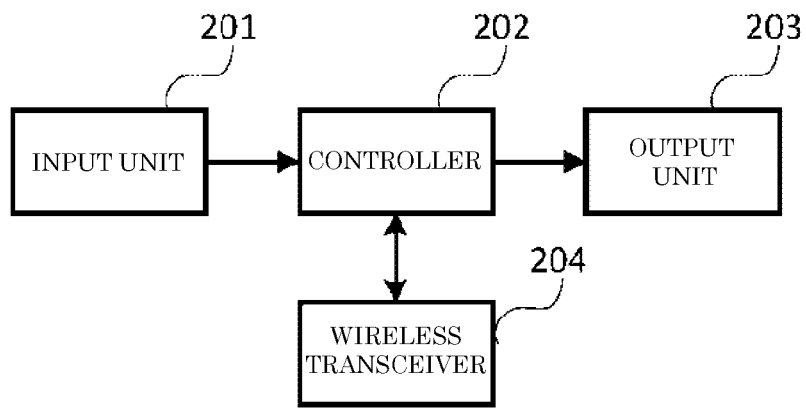
FIG. 6 is a diagram showing an example of a configuration of a wireless terminal.

FIG. 6 is a diagram showing the example of the configuration of wireless terminal 104. As shown in FIG. 6, wireless terminal 104 includes input unit 201, controller 202, output unit 203, and wireless transceiver 204. Since wireless terminals 105 to 110 each have a configuration similar to the configuration of wireless terminal 104, the description is omitted.

To input unit 201, for example, at least one sensor of a temperature sensor, a moisture sensor, a luminance sensor, a geomagnetic sensor, a direction sensor, an acceleration sensor, and an image sensor is connected. Input unit 201 inputs information (signal) detected by the connected sensor. Note that to input unit 201, a switch, a keyboard, a microphone, a camera, and the like for sensing input information from a user may be connected besides the sensor.

Controller 202 performs predetermined control based on sensing data input by input unit 201. Moreover, controller 202 controls predetermined control based on application control command AC (i) or position estimation control command PC (j) input via wireless transceiver 204. For example, controller 202 generates data to be output to output unit 203, or application control response AR (i) or position estimation control response PR (j) to be output via wireless transceiver 204.

To output unit 203, for example, a light source such as an LED, an image output device such as a display, an actuator device such as a vibration motor, and a voice output device such as a speaker are connected. Output unit 203 outputs data output from controller 202 to the connected device.

Wireless transceiver 204 performs wireless communication between the wireless terminals based on the control from controller 202. For the wireless communication, for example, various wireless communication systems such as specified small power radio using a 920 MHz band or 2.4 GHz band, Zigbee (registered trademark), Bluetooth (registered trademark), and Wi-Fi (registered trademark) can be used.

An example of an application applicable to wireless communication system 100 will be described below. Hereinafter, it is assumed that a color LED connected to output unit 203 of a child node is lit while the color of the color LED is changed according to the position of the child node so as to display a pattern. If a plurality of patterns is prepared in advance, for example, after a predetermined time has passed, or by a trigger through an operation, patterns can be switched, and illumination that changes and a moving image can be projected.

A process flow of application control 101 will be described below.

Figure 7:
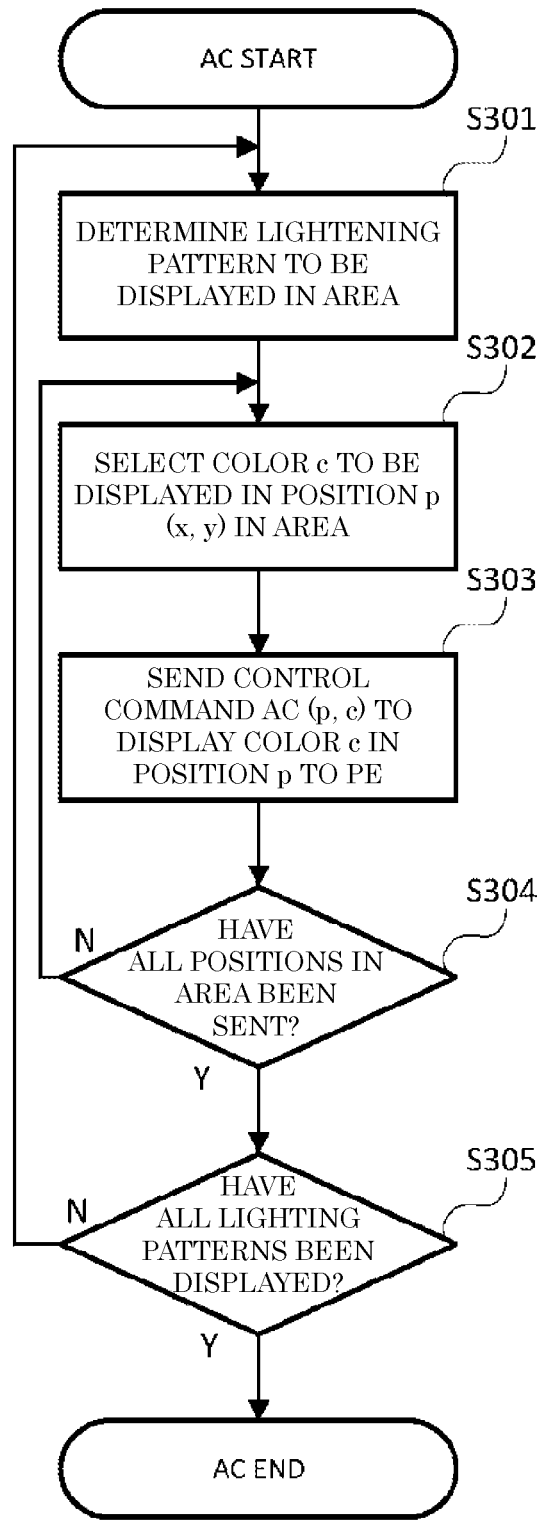
FIG. 7 is a flowchart showing an example of a process flow of an application control.

FIG. 7 is a flowchart showing an example of a process flow of application control 101. "S" shown in FIG. 7 represents a step.

In step S301, application control 101 determines a lighting pattern to be displayed in an area where child nodes 105 to 110 exist.

In step S302, application control 101 divides the pattern determined in S301 based on positions and selects color information to be lit in each position. For example, in a case where child nodes 105 to 110 are assumed to be disposed in a lattice shape, application control 101 divides the lighting pattern into a similar lattice shape. Then, application control 101 determines coordinate p (x, y) of each lattice and color c to be lit.

In step S303, application control 101 generates application control command AC (p, c) that lights color c in position p determined in S302, and sends the command to position estimator 102. A control process flow of position estimator 102 will be described with reference to FIGS. 8A and 8B.

In step S304, application control 101 determines whether the application control command has been sent to all the positions in the area. In a case where the application control command has not been sent (N), application control 101 shifts the process to step S302. On the other hand, in a case where the application control command has been sent (Y), application control 101 shifts the process to step S305.

In step S305, application control 101 determines whether all of the plurality of patterns prepared in advance are displayed. In a case where not all the patterns are displayed (N), application control 101 shifts the process to step S301. In a case where all the patterns are displayed (Y), application control 101 ends the application operation.

A process flow of position estimator 102 will be described below.

Figure 8A:
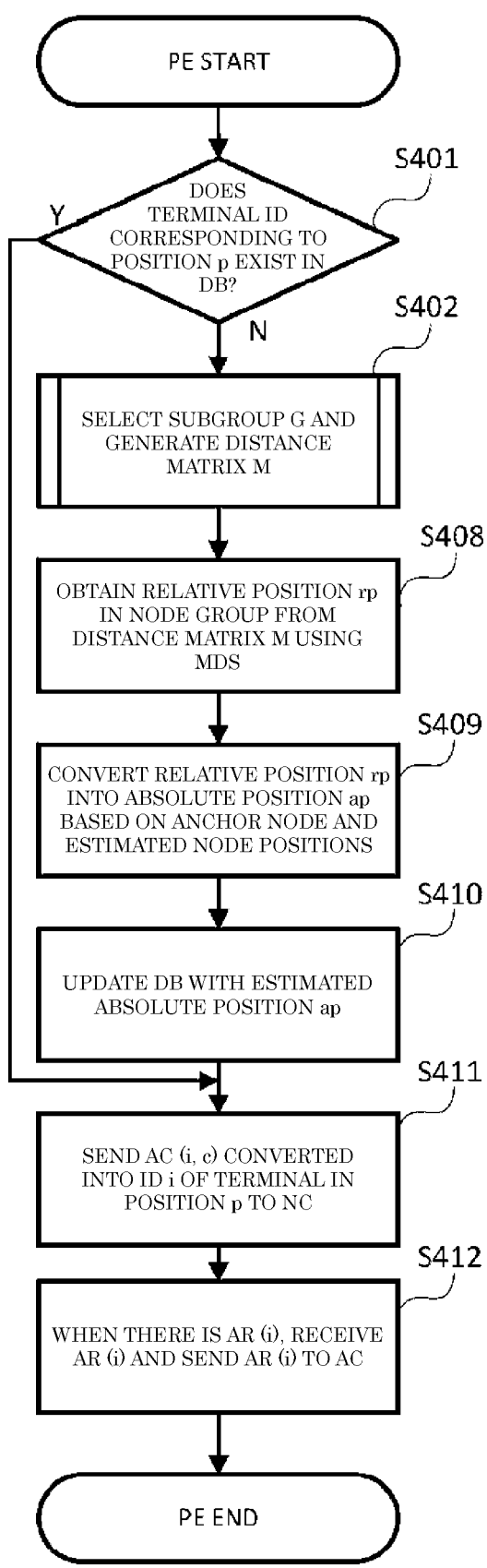
FIG. 8A is a flowchart showing an example of a process flow of a position estimation.

FIG. 8A is a flowchart showing an example of a process flow of position estimator 102. "S" shown in FIG. 8A represents a step. Position estimator 102 executes the following process after receiving application control command AC (p, c) sent from application control 101 in step S303 of FIG. 7.

In step S401, position estimator 102 determines whether a terminal ID that corresponds to position p of received application control command AC exists in conversion table DB. In a case where the terminal ID that corresponds to position p exists in conversion table DB (Y), position estimator 102 shifts the process to step S411. On the other hand, in a case where the terminal ID that corresponds to position p does not exist in conversion table DB (N), position estimator 102 shifts the process to step S402.

If the terminal ID is an ID of a parent node or an anchor child node, position p is known. Therefore, the terminal ID that corresponds to position p exists in conversion table DB. Moreover, even in a case where the terminal ID is an ID of a non-anchor child node, if the position of the non-anchor child node has been estimated until that time, the terminal ID that corresponds to position p exists in conversion table DB. Note that in consideration of a movement of the non-anchor child node, position p and the terminal ID of the non-anchor child node may be deleted from conversion table DB as time elapses.

In step S402, position estimator 102 generates distance matrix M between child nodes (including a distance between a parent node and a child node) in order to estimate the position of the non-anchor child node. Here, position estimator 102 selects subgroup G from child nodes 105 to 110, and in order to obtain the estimated distances of all combinations among the child nodes in subgroup G, shifts the process to step S403 of FIG. 8B. Note that subgroup G may be randomly selected. Alternatively, at least one child node may be replaced by another to select subgroup G.

Figure 8B:
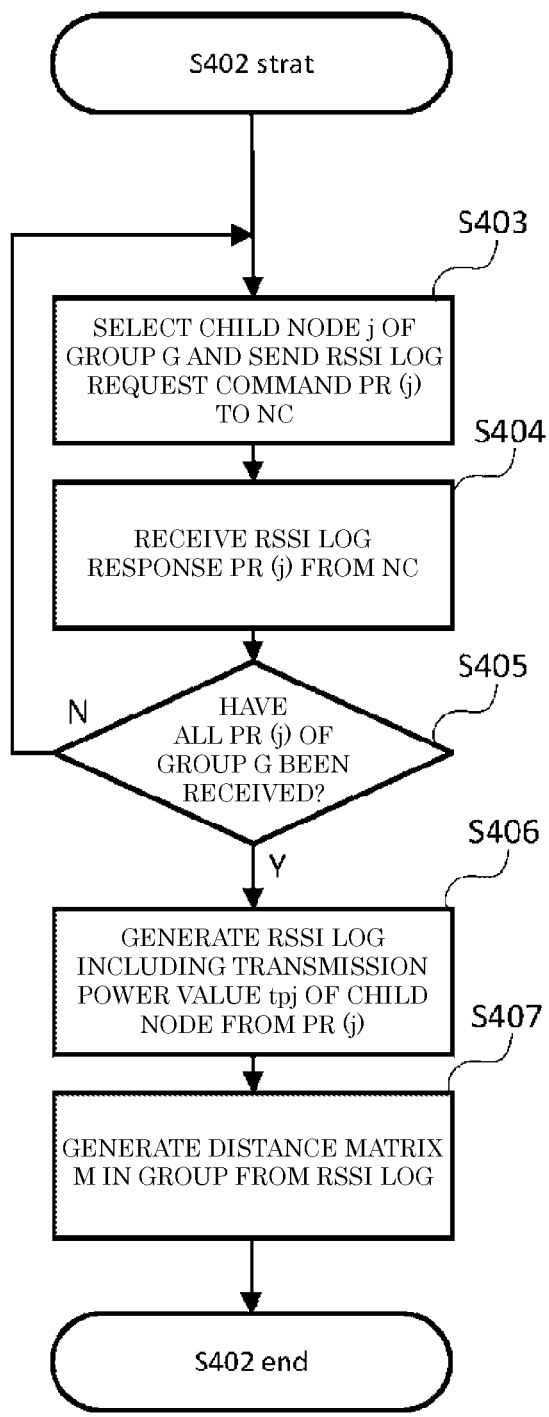
FIG. 8B is a flowchart showing an example of a process flow of the position estimation.

FIG. 8B is a flowchart showing an example of a process flow of position estimator 102. In step S403, position estimator 102 first selects child node j from subgroup G. Then, position estimator 102 generates position estimation control command PC (j) that requests selected child node j to send a log of a received signal strength indication (RSSI) (received power) of wireless packets that have been received until then to the parent node. Then, position estimator 102 sends position estimation control command PC (j) that has been generated to network control 103.

In step S404, position estimator 102 receives position estimation control response PR (j) (see step S505 of FIG. 13) sent from network control 103. Position estimation control response PR (j) includes a log of an RSSI between child nodes (including a log of an RSSI between a parent node and a child node). After receiving position estimation control response PR (j), position estimator 102 shifts the process to step S405. Note that in a case where position estimator 102 has not received position estimation control response PR (j) within a predetermined time, position estimator 102 may determine that timeout has occurred and shift the process to step S405.

In step S405, position estimator 102 determines whether position estimator 102 has received position estimation control responses PR (j) from all the child nodes of subgroup G. In a case where position estimator 102 has not received position estimation control responses PR (j) from all the child nodes (N), position estimator 102 shifts the process to step S403. On the other hand, in a case where position estimator 102 has received position estimation control responses PR (j) from all the child nodes (Y), position estimator 102 shifts the process to step S406.

In step S406, position estimator 102 generates an RSSI log from received position estimation control response PR (j). For example, position estimator 102 generates an RSSI log that includes a transmission power value of a wireless packet of the child node of subgroup G included in received position estimation control response PR (j), and a log of an RSSI when the child node has received a wireless packet sent from another child node. Position estimator 102 obtains a propagation loss among the child nodes in the subgroup by correcting the RSSI log with the transmission power value of each child node.

In step S407, position estimator 102 converts the RSSI log into a distance based on the propagation loss among the child nodes in the subgroup obtained in step S406 and generates distance matrix M between the respective child nodes.

Here, a subgroup and a distance matrix will be described.

Figures 9, 10, 11:
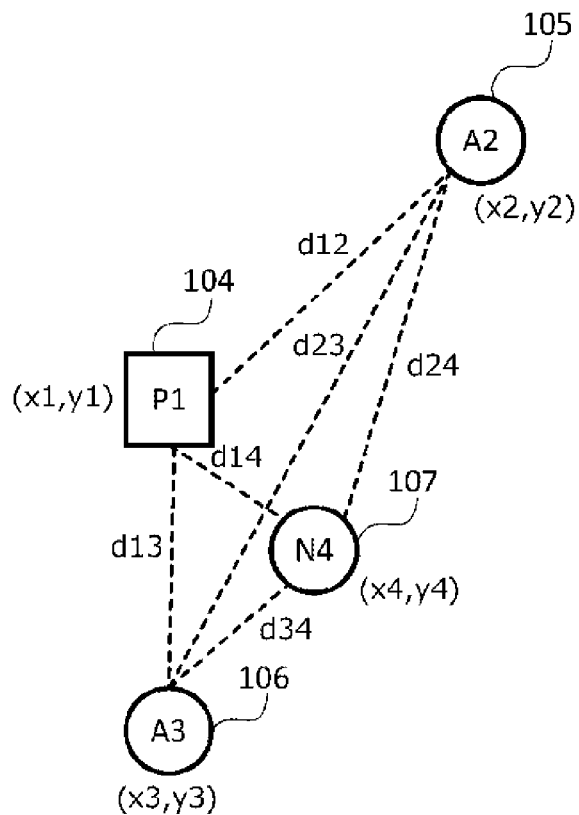
FIG. 9 is a diagram showing an example of a subgroup.
FIG. 10 is a diagram showing an example of a distance matrix of the subgroup.
FIG. 11 is a diagram showing an example of a relative coordinate matrix of the subgroup.

FIG. 9 is a diagram showing an example of the subgroup. In FIG. 9, the same elements as those in FIG. 5 are denoted by the same reference numerals.

As shown in FIG. 9, position estimator 102 configures subgroup G with parent node 104 and child nodes 105, 106, 107. Here, parent node 104 is P1, anchor child node 105 is A2, anchor child node 106 is A3, and non-anchor child node 107 is N4.

The absolute coordinate of each of the parent node and the child nodes is as follows: (x1, y1) is for parent node P1, (x2, y2) is for anchor child node A2, (x3,y3) is for anchor child node A3, and (x4, y4) is for non-anchor child node N4. The absolute coordinates except for (x4, y4) of non-anchor child node N4 are known. When terminal numbers are i, j, distance d between the terminals is dij=dji.

FIG. 10 is a diagram showing an example of distance matrix M of the subgroup. Distance matrix M shown in FIG. 10 shows distances between the respective child nodes (including a distance between the parent node and a child node) in the subgroup shown in FIG. 9.

In FIG. 10, dij indicates a distance between terminals with terminal numbers i, j. For example, the distance between parent node P1 and child node A2 is "d12". The distance between child node A2 and child node A3 is "d23". In this manner, as shown in FIG. 10, position estimator 102 generates distance matrix M between the respective child nodes in the subgroup shown in FIG. 9.

Note that position estimator 102 generates distance matrix M while replacing one child node with another in the subgroup (see step S402). At this time, position estimator 102 selects all of child nodes 105 to 110. For example, in the case where position estimator 102 replaces the child nodes one by one, position estimator 102 continues to replace the child nodes until all the child nodes are sequentially selected. Specifically, after selecting child nodes A2, A3, N4 (see FIG. 5), position estimator 102 selects child nodes A3, N4, N5. Then, after selecting child nodes N4, N5, N6, position estimator 102 selects child nodes N5, N6, N7. Further, after selecting child nodes N6, N7, A2, position estimator 102 selects child nodes N7, A2, A3.

The description returns to the process flow of FIG. 8A. In step S408, position estimator 102 estimates relative positions rp between the respective child nodes using distance matrix M of subgroup G. Position estimator 102 converts, for example, distance matrix M between the respective child nodes into, for example, coordinate values on a two-dimensional (or three-dimensional) space coordinate system using the multi dimensional scaling.

In this manner, child nodes (including a parent node) having a short distance from each other are disposed to have a short distance from each other, and child nodes having a long distance from each other are disposed to have a long distance from each other. That is, position estimator 102 estimates a positional relation of child nodes that preserves a distance relation.

Note that estimated relative positions rp indicate a relative relation between the child nodes of subgroup G, but do not necessarily coincide with the absolute positions. Therefore, position estimator 102 causes these relative positions rp to rotate, reverse, move in parallel, expand, or shrink. That is, position estimator 102 converts relative positions rp into absolute positions.

Here, a relative position and an absolute position will be described.

FIG. 11 is a diagram showing an example of a relative coordinate matrix of the subgroup. FIG. 11 shows distance matrix M shown in FIG. 10 after being converted into coordinate values on a two-dimensional space coordinate system by means of the multi dimensional scaling. For example, when relative coordinates are estimated (calculated) so as to preserve the distance relations of wireless terminals P1, A2, A3, N4 shown in FIG. 10, the respective coordinates are represented by coordinates (rx1, ry1) to (rx4, ry4).

Figure 12:
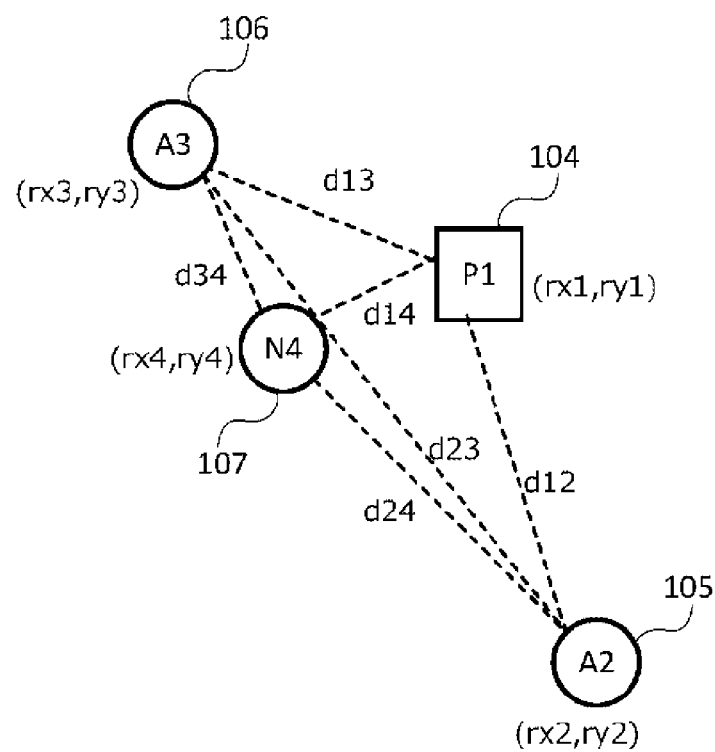
FIG. 12 is a diagram showing an example of a relative position of the subgroup.

FIG. 12 is a diagram showing an example of a relative position of the subgroup. Relative coordinates of wireless terminals P1, A2, A3, N4 shown in FIG. 11 have, for example, the positional relations as shown in FIG. 12. The distance relations among wireless terminals P1, A2, A3, N4 preserve the distances of distance matrix M shown in FIG. 10. Considering a polygon having vertexes formed of the respective coordinates of child nodes A2, A3, N4, the positional relations shown in FIG. 12 are similar to the positional relations of absolute positions shown in FIG. 9, but the polygon is rotated as a whole. Therefore, position estimation 101 converts relative positions rp into absolute positions as described below.

The description returns to FIG. 8A. In step S409, position estimator 102 converts relative positions rp of subgroup G estimated in step S408 into absolute positions. For example, position estimator 102 causes relative positions rp estimated in step S408 to rotate, reverse, move in parallel, expand or shrink to deform so as to minimize a discrepancy between the coordinates, and the coordinates of the anchor child nodes whose positions have been already known or the coordinates of non-anchor child nodes whose positions have been estimated before. Then, position estimator 102 defines the deformed coordinates of relative positions rp of the respective child nodes as estimated absolute positions ap of the respective child nodes.

For example, the absolute coordinates of wireless terminal P1, which is a parent node, and wireless terminals A2, A3, which are anchor child nodes, have been already known. Therefore, position estimator 102 performs deformation so as to minimize the discrepancy between relative coordinates (rx1, ry1), (rx2, ry2), (ry3, ry3) of wireless terminals P1, A2, A3 shown in FIG. 12 and absolute coordinates (x1,y1), (x2,y2), (x3,y3) of wireless terminals P1, A2, A3 that have been already known. In the case of FIG. 12, position estimator 102 causes a centroid point of each of the relative coordinates and a centroid point of each of the absolute coordinates to move in parallel to coincide with each other, and rotates the relative coordinates around the gravity center points to minimize the discrepancy. Position estimator 102 defines deformed coordinate value (rx4a, ry4a) of non-anchor child node N4 as estimated absolute coordinate (x4a, y4a).

In step S410, position estimator 102 updates conversion table DB with estimated absolute position ap of each child node. Position estimator 102 adds estimated absolute position ap to conversion table DB for a non-anchor child node whose position has not been estimated before, or a child node whose estimated absolute position ap that has been estimated until that time has been deleted as time has elapses.

Note that in the case where the position has been estimated by that time, after adding a weight according to the passage of time, an association between position p and a terminal ID of conversion table DB may be updated through a calculation of averaging of the coordinate value that has been estimated before and the coordinate value that is estimated this time.

For example, after estimating the absolute coordinates of subgroup (P1, A2, A3, N4) shown in FIG. 9, position estimator 102 estimates the absolute coordinates of (A2, A3, N4, N5) as the next subgroup. When estimating the absolute coordinates of subgroup (A2, A3, N4, N5), although the estimation is less reliable, position estimator 102 can use the absolute coordinate of non-anchor child node N4, which has been estimated at the time of estimating the absolute coordinates of subgroup (P1, A2, A3, N4) as an anchor.

Then, position estimator 102 repeats this process and averages the estimated absolute coordinates to improve the estimation reliability. At this time, position estimator 102 may average the absolute coordinates by adding a weight that corresponds to the passage of time.

In step S411, position estimator 102, based on conversion table DB, extracts terminal ID i that corresponds to position p, and converts application control command AC (p) into AC (i). Position estimator 102 sends application control command AC (i) to network control 103.

Then, in step S412, in a case where there is no response that corresponds to application control command AC (i), position estimator 102 ends the process. In a case where there is a response, position estimator 102 waits until receiving application control response AR (i) from network control 103, and inversely transforms terminal ID i into position p based on conversion table DB. Position estimator 102 sends application control response AR (p) to application control 101, and ends the process of the flowchart.

Note that regardless of a request for sending an application control command from application control 101, position estimator 102 may repeatedly execute the process flow related to position estimation (from step S402 to S410) to continue updating conversion table DB.

A process flow of network control 103 will be described below.

Figure 13:
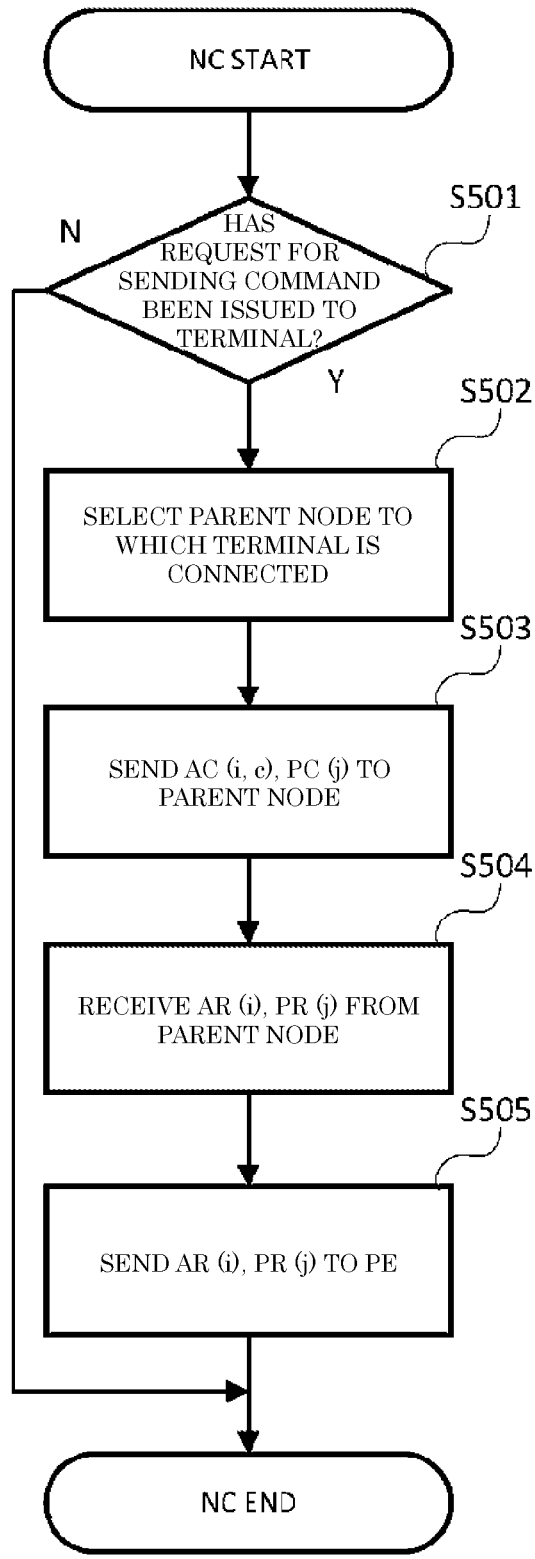
FIG. 13 is a flowchart showing an example of a process flow of a network control.

FIG. 13 is a flowchart showing an example of the process flow of network control 103. "S" shown in FIG. 13 represents a step. Here, parent node 104 and child nodes 105 to 110 have been already wirelessly connected, and network control 103 holds information of these wireless terminals.

In step S501, network control 103 determines whether a request for sending a command has been issued from position estimator 102. A request for sending a command includes, for example, a request for sending application control command AC (i, c) from position estimator 102 sent in step S411 of FIG. 8A, and a request for sending position estimation control command PC (j) from position estimator 102 sent in step S403. If no request for sending a command has been issued (N), network control 103 ends the process. If a request for sending a command has been issued (Y), network control 103 shifts the process to step S502.

In step S502, network control 103 selects a parent node to which a terminal that has been requested to send a command is connected. In FIG. 5, since parent node 104 is one unit, parent node 104 is selected. However, in a case where a plurality of parent nodes is connected, an appropriate parent node is selected according to the subordinate child nodes.

In step S503, network control 103 sends application control command AC (i, c) and position estimation control command PC (j) that have been requested to be sent to parent node 104 selected in step S502.

In step S504, network control 103 receives application control response AR (i) or position estimation control response PR (j) from parent node 104. After receiving AR (i) or PR (j), network control 103 shifts the process to step S505. Note that in a case where network control 103 has not received AR (i) or PR (j) during a predetermined time, network control 103 may determine that timeout has occurred and shift the process to step S505.

In step S505, network control 103 sends application control response AR (i) or position estimation control response PR (j) received in step S504 to position estimator 102.

A process flow of parent node 104 will be described below.

Figure 14:
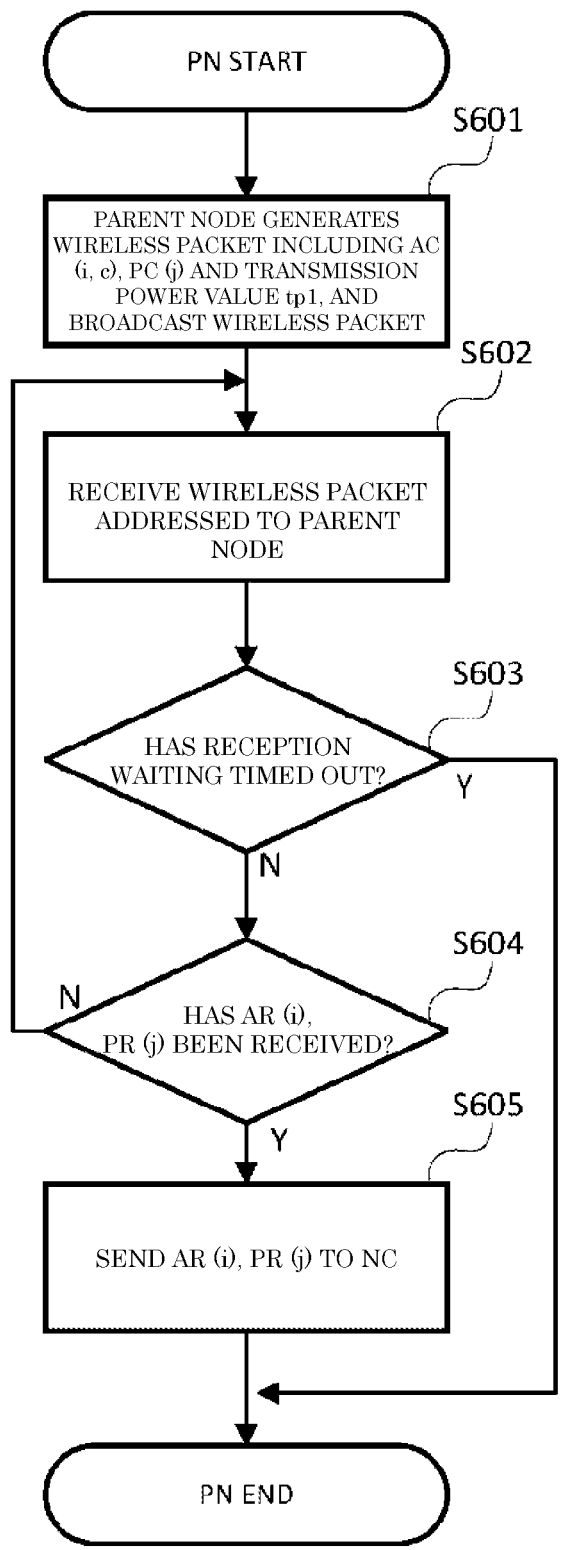
FIG. 14 is a flowchart showing an example of a process flow of a parent node.

FIG. 14 is a flowchart showing an example of the process flow of parent node 104. "S" shown in FIG. 14 represents a step.

In step S601, parent node 104 receives application control command AC (i, c) or position estimation control command PC (j) from network control 103. These commands are sent from network control 103 in step S503 of FIG. 13.

After receiving AC (i, c) or PC (j) command from network control 103, parent node 104 generates a wireless packet for wirelessly sending the command to a child node. The wireless packet includes information of transmission power information tp1, destination address da, and transmission source address sa. Transmission power information tp1 represents a transmission power value of the wireless packet. Parent node 104 specifies a broadcast address in destination address da, and enters the address of parent node 104 in transmission source address sa, and then sends the wireless packet.

In step S602, parent node 104 puts wireless transceiver 204 into a reception waiting state, and receives the wireless packet addressed to the parent node (destination address da is the address of parent node 104).

In step S603, parent node 104 determines whether reception waiting has timed out. In a case where reception waiting has timed out (Y), parent node 104 ends the process of the flowchart. On the other hand, in a case where reception waiting has not timed out (N), parent node 104 shifts the process to step S604.

In step S604, parent node 104 determines whether the received wireless packet addressed to the parent node includes application control response AR (i) or position estimation control response PR (j). In a case where the received wireless packet addressed to the parent node does not include application control response AR (i) or position estimation control response PR (j) (N), in order to wait for a response, parent node 104 shifts the process to step S602. On the other hand, in a case where the received wireless packet addressed to the parent node does includes application control response AR (i) or position estimation control response PR (j) (Y), parent node 104 shifts the process to step S605.

In step S605, parent node 104 sends application control response AR (i) or position estimation control response PR (j) received in step S604 to network control 103.

A process flow of child nodes 105 to 110 will be described below.

Figure 15:
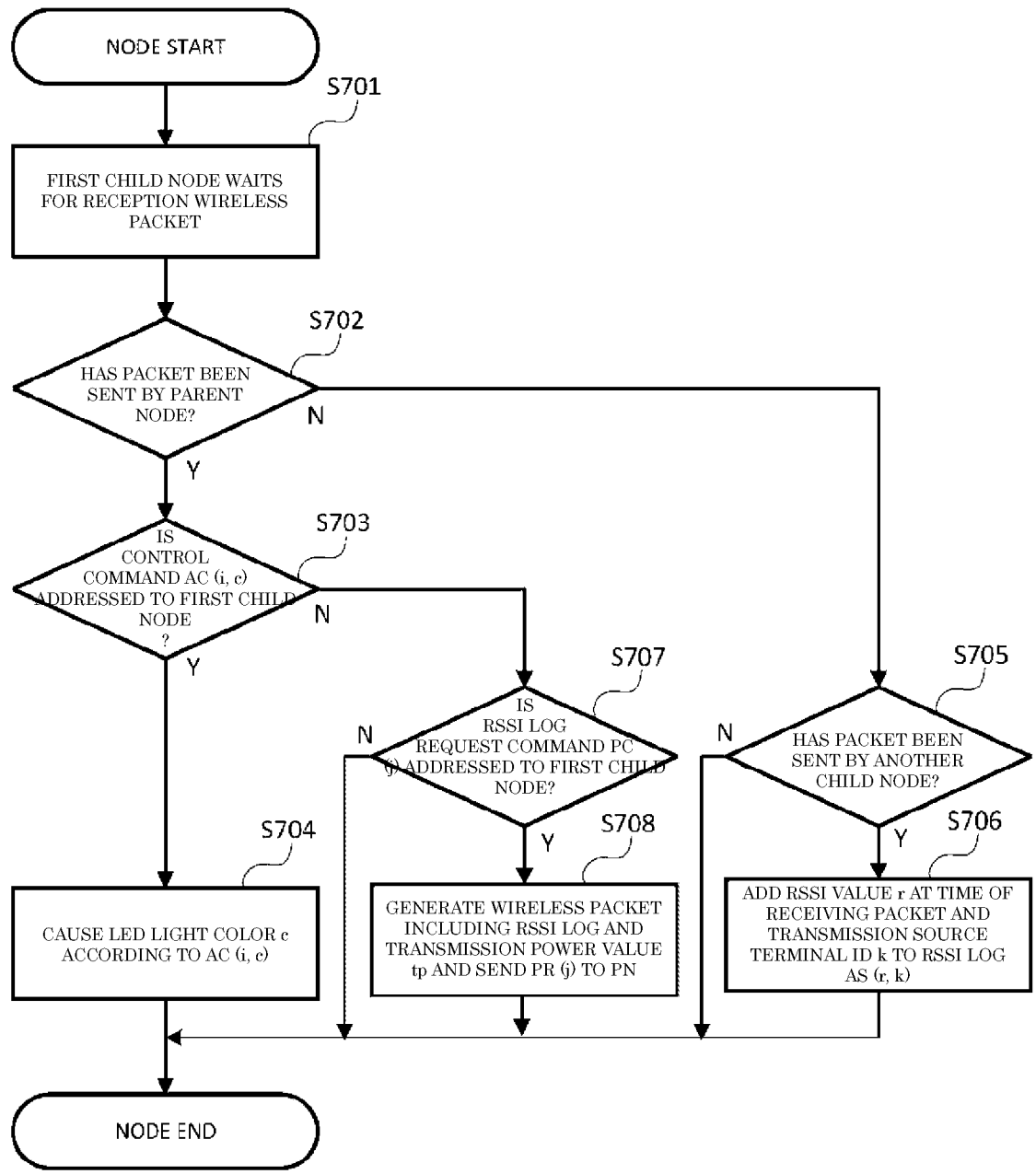
FIG. 15 is a flowchart showing an example of a process flow of a child node.

FIG. 15 is a flowchart showing an example of the process flow of child node 105. "S" shown in FIG. 15 represents a step. Child nodes 106 to 110 each also execute a process similar to the process flow shown in FIG. 15.

In step S701, child node 105 puts wireless transceiver 204 into a reception waiting state and waits for reception of a wireless packet.

In step S702, child node 105 determines whether the received wireless packet is the one sent from parent node 104. For example, child node 105 determines whether transmission source address sa of the received wireless packet is the address of parent node 104. In a case where the received wireless packet is the one sent from parent node 104 (Y), child node 105 shifts the process to step S703. On the other hand, in a case where the received wireless packet is not the one sent from parent node 104 (N), child node 105 shifts the process to step S705.

In step S703, child node 105 determines whether the received wireless packet includes application control command AC (i, c) addressed to child node 105. Application control command AC (i, c) is sent from parent node 104 in step S601 shown in FIG. 14. In a case where "i" of received application control command AC (i, c) is the terminal ID of child node 105 (Y), child node 105 shifts the process to step S704. On the other hand, in a case where "i" of received application control command AC (i, c) is not the terminal ID of child node 105 (N), child node 105 shifts the process to step S707.

In step S704, child node 105 causes a color LED connected to output unit 203 to light color c according to received application control command AC (i, c). Then, child node 105 ends the process of the flowchart. Note that, although not shown, child node 105 may generate a wireless packet including application control response AR (i) and send the wireless packet to parent node 104.

In step S705, child node 105 determines whether the received wireless packet is the one sent from another child node. In a case where the received wireless packet is the one sent from another child node (Y), child node 105 shifts the process to step S706. On the other hand, in a case where the received wireless packet is not the one sent from another child node (N), child node 105 ends the process of the flowchart.

In step S706, child node 105 preserves an RSSI of the wireless packet sent by another child node (a wireless packet sent by another child node in step S708 described below) and terminal ID k of the transmission source as a log of the RSSI. In this manner, child node 105 can collect RSSIs between child nodes by receiving a wireless packet sent to parent node 104 by another child node.

Note that since the wireless packet sent in step S708 includes position estimation control response PR (k), child node 105 can acquire terminal ID k of the transmission source. Alternatively, child node 105 may preserve transmission source address sa of the received wireless packet instead of terminal ID k.

In step S707, child node 105 determines whether the wireless packet sent by parent node 104 includes position estimation control command PC (j) addressed to child node 105. In a case where "j" of received position estimation control command PC (j) is the terminal ID of child node 105 (Y), child node 105 shifts the process to step S708. On the other hand, in a case where "j" of received position estimation control command PC (j) is not the terminal ID of child node 105 (N), child node 105 ends the process of the flowchart.

In step S708, according to position estimation control command PC (j), child node 105 generates position estimation control response PR (j) including logs of RSSIs that have been stored in step S706 until that time. Child node 105 generates a wireless packet in order to send position estimation control response PR (j) to parent node 104. The wireless packet includes transmission power information tpj, destination address da, and transmission source address sa.

Transmission power information tpj represents a transmission power value of for sending this wireless packet. Child node 105 specifies the address of parent node 104 in destination address da, enters the address of child node 105 in transmission source address sa, sends the wireless packet, and then ends the process of the flowchart.

Wireless communication system 100 repeats the operations described above to control an application of a child node, and, at the same time, collects RSSI information between child nodes and estimates a positional relation of the child nodes.

Various exemplary embodiments have been described above with reference to the drawings. However, it is obvious that the present disclosure is not limited to the examples according to the exemplary embodiments. It is apparent that those skilled in the art could easily conceive of various changes and modifications within the scope of the claims, and it is understood that the changes and modifications are naturally within the technical scope of the present disclosure. Moreover, the components in the exemplary embodiments described above may be arbitrarily combined without departing from the spirit of the disclosure.

In the exemplary embodiments described above, the present disclosure has been described in an example of a configuration using hardware. However, the present disclosure can be implemented with software through a cooperation with hardware.

Moreover, the functional blocks used in the descriptions of the exemplary embodiments described above can be typically implemented as a large-scale integration (LSI) that is an integrated circuit. The integrated circuit controls the functional blocks used in the descriptions of the exemplary embodiments, and may include an input and an output. The functional blocks may be individually implemented as separate chips or some or all of the functional blocks may be integrated into one chip. Here, an LSI is exemplified, but the LSI may be referred to as an integrated circuit (IC), a system LSI, a super LSI, or an ultra LSI depending on the difference in the degree of integration.

Further, a method for circuit integration is not limited to the LSI, and may be implemented by a dedicated circuit or a general-purpose processor. It is possible to use a field programmable gate array (FPGA) that can be programmed after manufacturing the LSI or a reconfigurable processor in which connections or settings of circuit cells in the LSI can be reconfigured.

Further, when there emerges a technique for circuit integration that replaces the LSI as a result of the advancement of semiconductor technology or other derivative technology, the functional blocks may be integrated by using that technique. Application of biotechnology or the like may be possible.

SUMMARY OF THE PRESENT DISCLOSURE

The position estimation device of the present disclosure includes: a selector configured to select N wireless terminals from M wireless terminals, and to replace at least one of the selected N wireless terminals with a same number of wireless terminals other than the selected N wireless terminals among the M wireless terminals to reselect N wireless terminals, M being an integer equal to or greater than two, N being an integer equal to or greater than one and being less than M, the M wireless terminals including a child wireless terminal; a distance calculator configured to calculate distances among wireless terminals in a group consisting of a parent wireless terminal and the N wireless terminals based on information on power of radio signals of packets transmitted and received among wireless terminals in the group for the N wireless terminals selected and reselected; a relative position calculator configured to calculate relative positions of the M wireless terminals based on the distances among the wireless terminals in the group for the N wireless terminals selected and reselected; and an absolute position converter configured to convert at least one relative position of the child wireless terminal into at least one absolute positon of the child wireless terminal based on the relative positions of the M wireless terminals and absolute positions of at least three of the M wireless terminals where the absolute positions are known.

The position estimation method of the present disclosure includes: selecting N wireless terminals from M wireless terminals, and replacing at least one of the selected N wireless terminals with a same number of wireless terminals other than the selected N wireless terminals among the M wireless terminals to reselect N wireless terminals, M being an integer equal to or greater than two, N being an integer equal to or greater than one and being less than M, the M wireless terminals including a child wireless terminal; calculating distances among wireless terminals in a group consisting of a parent wireless terminal and the N wireless terminals based on information on power of radio signals of packets transmitted and received among the wireless terminals in the group for the N wireless terminals selected and reselected; calculating relative positions of the M wireless terminals based on the distances among the wireless terminals in the group for the N wireless terminals selected and reselected; and converting at least one relative position of the child wireless terminal into at least one absolute positon of the child wireless terminal based on the relative positions of the M wireless terminals and absolute positions of at least three of the M wireless terminals where the absolute positions are known.

The present disclosure is useful for a wireless communication system.

What is claimed is:

1. A position estimation device comprising:
   a selector configured to select N wireless terminals from M wireless terminals, and to replace at least one of the selected N wireless terminals with a same number of wireless terminals other than the selected N wireless terminals among the M wireless terminals to reselect N wireless terminals, M being an integer equal to or greater than two, N being an integer equal to or greater than one and being less than M, the M wireless terminals including a child wireless terminal;
   a distance calculator configured to calculate distances among wireless terminals in a group consisting of a parent wireless terminal and the N wireless terminals based on information on power of radio signals of packets transmitted and received among wireless terminals in the group for the N wireless terminals selected and reselected;
   a relative position calculator configured to calculate relative positions of the M wireless terminals based on the distances among the wireless terminals in the group for the N wireless terminals selected and reselected; and
   an absolute position converter configured to convert at least one relative position of the child wireless terminal into at least one absolute positon of the child wireless terminal based on the relative positions of the M wireless terminals and absolute positions of at least three of the M wireless terminals where the absolute positions are known.

2. The position estimation device according to claim 1, wherein
   the at least one relative position of the child wireless terminal includes a plurality of relative positions of the child wireless terminal,
   the at least one absolute positon of the child wireless terminal includes a plurality of absolute positions of the child wireless terminal, and
   the position estimation device further comprises an average calculator configured to calculate an average of the plurality of absolute positions of the child wireless terminal.

3. The position estimation device according to claim 2, wherein the average calculator calculates a weighted average of the plurality of absolute positions of the child wireless terminal based on lapse in times since the absolute positions have been lastly estimated.

4. The position estimation device according to claim 1, further comprising
   a network controller configured to instruct the parent wireless terminal to broadcast a packet including a command requesting transmission of the information on power of each of the radio signals, and to receive the information on the power of each of the radio signals via the parent wireless terminal from the child wireless terminal that received the packet including the command,
   wherein the distance calculator calculates distances between the N wireless terminals for the N wireless terminals selected and reselected based on the information on the power of the radio signals received by the network controller.

5. The position estimation device according to claim 4, wherein
   a packet including the information on the power of each of the radio signals sent from the child wireless terminal to the parent wireless terminal include information on transmission power of the packet including the information on the power of corresponding one of the radio signals, another child wireless terminal in the M wireless terminals retains, as the information on the power of the radio signals, information on received power of each of the radio signals sent from the child wireless terminal and the information on the transmission power of corresponding one of the radio signals sent from the child wireless terminal, and the network controller receives the retained information on the power of the radio signals via the parent wireless terminal from the other child wireless terminal.

6. A position estimation method comprising:

selecting N wireless terminals from M wireless terminals, and replacing at least one of the selected N wireless terminals with a same number of wireless terminals other than the selected N wireless terminals among the M wireless terminals to reselect N wireless terminals, M being an integer equal to or greater than two, N being an integer equal to or greater than one and being less than M, the M wireless terminals including a child wireless terminal;

calculating distances among wireless terminals in a group consisting of a parent wireless terminal and the N wireless terminals based on information on power of radio signals of packets transmitted and received among the wireless terminals in the group for the N wireless terminals selected and reselected;

calculating relative positions of the M wireless terminals based on the distances among the wireless terminals in the group for the N wireless terminals selected and reselected; and converting at least one relative position of the child wireless terminal into at least one absolute positon of the child wireless terminal based on the relative positions of the M wireless terminals and absolute positions of at least three of the M wireless terminals where the absolute positions are known.

7. A position estimation device comprising:

a selector configured to select, from first to M-th wireless terminals, where M is an integer of 1 or more, N wireless terminals, where N is an integer of 1 or more and M or less, and to replace at least one wireless terminal among the N wireless terminals selected with a wireless terminal from the remaining first to M-th wireless terminals not selected;

a distance calculator configured to calculate distances among the N wireless terminals selected based on power information of wireless packets transmitted and received among the N wireless terminals selected;

a relative position calculator configured to calculate relative positions of the first to M-th wireless terminals based on the calculated distances; and an absolute position convertor configured to convert a relative position of the second wireless terminal into an absolute position, where the absolute position of the second wireless terminal is unknown, based on the relative positions of the first to M-th wireless terminals and an absolute position of the first wireless terminal, where the absolute position of the first wireless terminal is known.

8. The position estimation device according to claim 7 further comprising an average calculator configured to calculate an average of the absolute position of the second wireless terminal converted by the absolute position convertor for each of the first to M-th wireless terminals.

9. The position estimation device according to claim 8, wherein the average calculator calculates a weighted average according to passage of time to the absolute position of the second wireless terminal.

10. The position estimation device according to claim 7 further comprising:

an instruction unit configured to instruct a fourth wireless terminal that is a parent terminal to broadcast a wireless packet including a command that requests transmission of the power information; and a receiver configured to receive the power information from child terminal that has received the wireless packet including the command addressed to a third wireless terminal that is the child terminal via the parent terminal, wherein the distance calculator calculates distances among the first to M-th wireless terminals based on the received power information.

11. The position estimation device according to claim 10, wherein the wireless packet including the power information sent by the child terminal to the parent terminal includes a transmission power value of the wireless packet, another child wireless terminal that is a wireless terminal other than the third wireless terminal and the fourth wireless terminal stores received power of the wireless packet sent by the child terminal and the transmission power value included in the wireless packet as the power information, and the receiver receives the power information stored by the child terminal from the child terminal via the parent terminal.

12. A position estimation method comprising:

selecting, from first to M-th wireless terminals, where M is an integer of 1 or more, N wireless terminals, where N is an integer of 1 or more and M or less;

replacing at least one wireless terminal among the N wireless terminals selected with a wireless terminal from the remaining first to M-th wireless terminals not selected;

calculating distances among the N wireless terminals selected based on power information of wireless packets transmitted and received among the N wireless terminals selected;

calculating relative positions of the first to M-th wireless terminals based on the calculated distances; and converting a relative position of the second wireless terminal into an absolute position, where the absolute position of the second wireless terminal is unknown, based on the relative positions of the first to M-th wireless terminals and an absolute position of the first wireless terminal, where the absolute position of the first wireless terminal is known.

* * * * *